(12) United States Patent
Messerschmidt

(10) Patent No.: US 7,511,891 B2
(45) Date of Patent: Mar. 31, 2009

(54) MINIATURIZED OPTICALLY IMAGING SYSTEM WITH HIGH LATERAL AND AXIAL RESOLUTION

(75) Inventor: Bernhard Messerschmidt, Jena (DE)

(73) Assignee: Grintech GmbH, Jena (DE)

( * ) Notice: Subject to any disclaimer, the term of this patent is extended or adjusted under 35 U.S.C. 154(b) by 63 days.

(21) Appl. No.: 11/861,450

(22) Filed: Sep. 26, 2007

(65) Prior Publication Data

US 2008/0080060 A1  Apr. 3, 2008

(30) Foreign Application Priority Data

Sep. 28, 2006  (DE) .................... 10 2006 046 555

(51) Int. Cl.
*G02B 9/00* (2006.01)
(52) U.S. Cl. ........................ 359/654; 359/652
(58) Field of Classification Search ............... 359/652, 359/654, 656, 881, 749, 753
See application file for complete search history.

(56) References Cited

U.S. PATENT DOCUMENTS

| 5,361,166 | A | 11/1994 | Atkinson et al. |
| 5,377,047 | A | 12/1994 | Broome et al. |
| 6,252,722 | B1 | 6/2001 | Kittaka et al. |
| 6,330,116 | B1 * | 12/2001 | Kittaka .................... 359/654 |

FOREIGN PATENT DOCUMENTS

| DE | 100 15 455 | 10/2001 |
| EP | 0 609 093 | 8/1994 |
| EP | 1 283 413 | 11/2004 |
| GB | 2 178 555 | 2/1987 |
| RU | 2179405 C2 * | 2/2002 |

OTHER PUBLICATIONS

Optics Letters, Nov. 1, 2004, vol. 29, No. 21, pp. 2521-2523, Werner Goebel, et al. "Miniaturized two-photon microscope based on a flexible coherent fiber bundle and a gradient-index lens objective".
Optics Communications, 188 (2001) Feb. 15, 2001, pp. 267-273, J. Knittel, et al. "Endoscope-compatible confocal microscope using a gradient index-lens system".

* cited by examiner

*Primary Examiner*—David N Spector
(74) *Attorney, Agent, or Firm*—Reed Smith LLP

(57) ABSTRACT

The invention is directed to a miniaturized optically imaging system with high lateral and axial resolution for endomicroscopic applications. To provide a miniaturized optical head which permits an appreciable increase in photon efficiency with high lateral and axial spatial resolution compared to conventional GRIN optics the plane side of a refractive, plano-convex, homogeneous lens defines a plane entrance surface of the optical system, and first and second GRIN lenses are arranged along the optical axis orthogonal to the entrance surface, wherein the first GRIN lens being arranged downstream of the refractive lens for reducing the divergence of the highly divergent light bundle transmitted from the object through the refractive lens, and the second GRIN lens being provided for adapting the light bundle transmitted by the first GRIN lens to the aperture and object field size of the downstream transmission system.

22 Claims, 8 Drawing Sheets

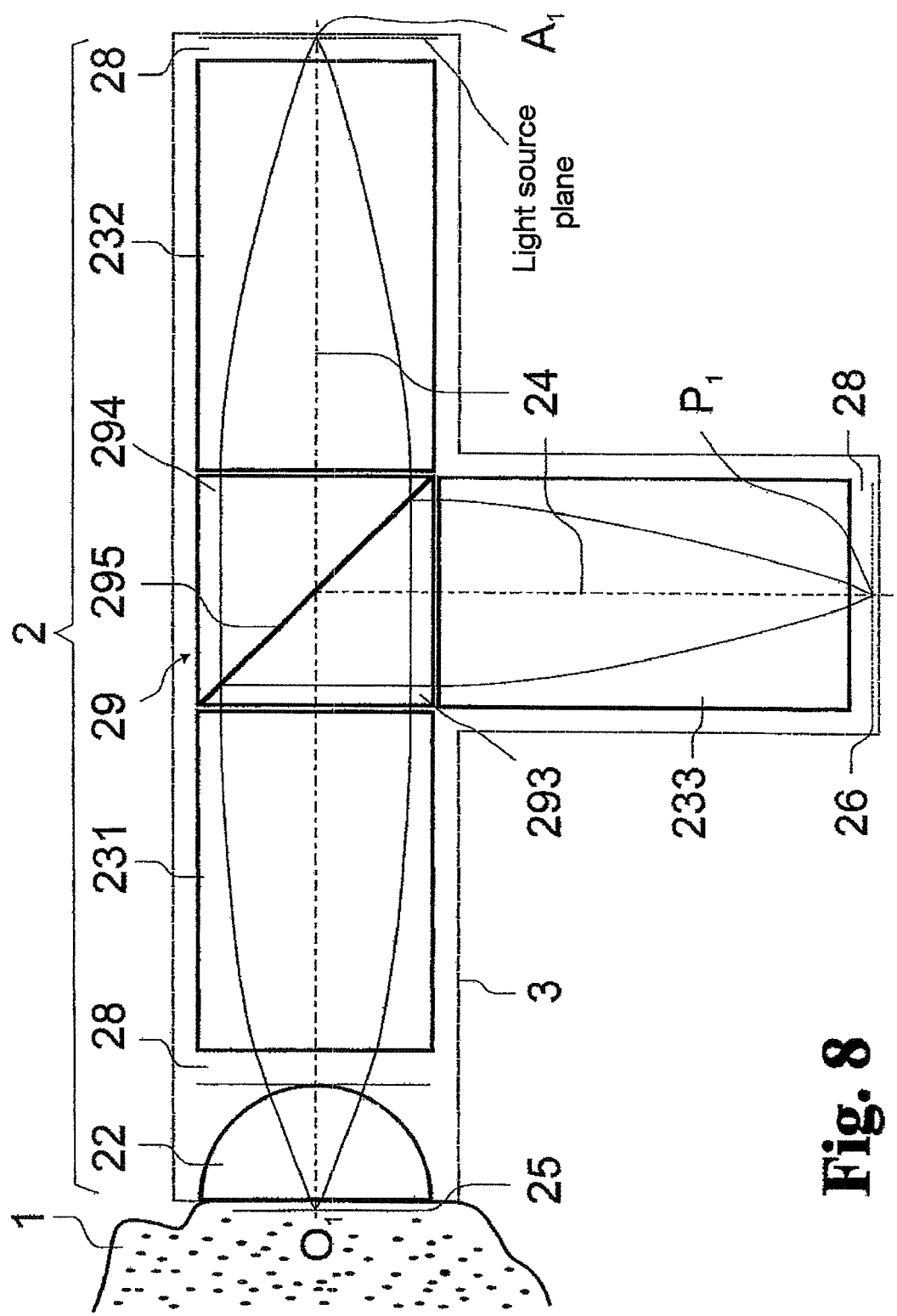

MINIATURIZED OPTICALLY IMAGING SYSTEM WITH HIGH LATERAL AND AXIAL RESOLUTION

CROSS-REFERENCE TO RELATED APPLICATIONS

This application claims priority of German Application No. 10 2006 046 555.5, filed Sep. 28, 2006, the complete disclosure of which is hereby incorporated by reference.

BACKGROUND OF THE INVENTION a) Field of the Invention

The invention is directed to a miniaturized optically imaging system with high lateral and axial resolution, particularly for endoscopic applications, which uses at least one GRIN lens system with a radial refractive index profile which generates an optical imaging of near-surface areas of an object in an image plane for an optical transmission system.

b) Description of the Related Art

Miniature optics play an important role for microscopy imaging, particularly in endomicroscopy. Endomicroscopic examination instruments are characterized by an optical image recording head which is small in diameter (a few millimeters) and in which the image must be transmitted over very long distances compared to the diameter.

Miniature optics of this kind image the surface of the object at high resolution in the micrometer range. The image is generated in transmitted light mode, in fluorescence microscopy, reflection microscopy, confocal microscopy or by scanning multiphoton fluorescence excitation.

In applications of this type, gradient-index (GRIN) lenses are used for the construction of miniature optics based on experience because they have a remarkably good imaging quality with typical small diameters between 0.2 and 2.0 mm and can be favorably integrated in small lens systems because of their generally plane optical surfaces. In GRIN lenses, the optical image-generating action is based on building a refractive index profile in the lens medium and, therefore, the refraction between two media (e.g., between air and glass) at curved surfaces is not necessarily needed for image formation. Therefore, miniature optics are comparatively simple to assemble. Miniaturized optics of this kind are known, for example, for endoscopic applications from EP 1 283 413 B1 and for laser scanning microscopes from DE 100 15 455 A1.

The solutions mentioned above are disadvantageous with respect to the imaging quality that can be achieved, which is clearly deficient primarily because of a low photon efficiency, a limited lateral and axial resolving capacity (due to the known relatively low numerical aperture of GRIN lenses of about 0.55) and the chromatic aberration of the GRIN lenses.

OBJECT AND SUMMARY OF THE INVENTION

It is the primary object of the invention to provide a novel possibility for realizing a miniaturized optical head, particularly for endomicroscopic applications, which permits an appreciable increase in photon efficiency with higher lateral and axial spatial resolution compared to conventional GRIN optics and avoids the need for complicated multi-lens systems. A further object consists in correcting chromatic aberration in optical imaging which can generally not be corrected particularly in GRIN optics.

In a miniaturized optically imaging system with high lateral and axial resolution, particularly for endoscopic applications, which uses at least one GRIN lens system with a radial refractive index profile which generates an optical imaging of near-surface areas of an object in an image plane for an optical transmission system with a small diameter compared to the transmission length, the above-stated object is met, according to the invention, in that a refractive plano-convex lens in the form of a homogeneous optical spherical lens element is provided and, together with the GRIN optics, forms an optical system, wherein the plane side of the spherical lens element defines a plane entrance surface of the optical system, and the entrance surface is oriented orthogonal to an optical axis common to both the optical system and the transmission system, in that the spherical lens element is followed by a first GRIN lens for reducing the divergence of the highly divergent light bundle from the spherical lens element, and in that a second GRIN lens for adapting the light bundle transmitted by the first GRIN lens to the aperture and object field of the downstream transmission system is arranged along the optical axis downstream of the first GRIN lens.

A diffractive lens is advantageously provided in a weakly divergent area of the light bundle of the optical system for correcting the chromatic aberration of the refractive spherical lens element and GRIN optics. The diffractive lens is preferably arranged between the first GRIN lens and the second GRIN lens.

In an alternative variant, the diffractive lens is advisably arranged between the refractive lens and the object-side first GRIN lens for correcting the chromatic aberration of an optical system.

The optical system which comprises at least a spherical lens element and a first and second GRIN lens is preferably arranged inside a cylindrical mechanical mount as a miniature optical head, the mechanical mount being hermetically closed by a window as entrance surface in front of the plane surface of the spherical lens element.

All of the optical components of the optical system are advantageously arranged along the optical axis without gaps.

For endomicroscopic applications, the miniature optical head is advisably completed by an image-conducting fiber bundle or rigid relay optics arranged downstream of the second GRIN lens on the optical axis. However, an individual optical fiber can also be arranged downstream of the second GRIN lens and is moved with respect to the optical system of the head by means of a microscanner so that it scans an image.

The transmission system following the second GRIN lens is advantageously fastened in the mechanical mount of the miniature optical head by means of an adapter sleeve. In so doing, a thin excitation fiber for coupling in light is advantageously aligned by means of the adapter sleeve, and either a reception fiber is provided around the thin excitation fiber concentric to the optical axis and aligned by the adapter sleeve or the thin excitation fiber on the optical axis is simultaneously used as a reception fiber.

In a first construction of the invention, the first GRIN lens and the second GRIN lens advantageously have the same refractive index profile.

However, it may also be expedient for the first GRIN lens and the second GRIN lens to have different refractive index profiles to adjust magnifications and to correct aberrations.

In a specific construction of the invention, the second GRIN lens is advantageously replaced by the conventional optics of a microscope body in which the miniature optical head replaces the microscope objective.

In another construction for which the requirements for chromatic correction are less stringent and in which, consequently, no diffractive lens is required, e.g., in monochromatic operating mode with integral signal reception in case of multiphoton microscopy or when using a fiber-optic scanner as transmission system to the sensor, the first GRIN lens and the second GRIN lens can also advisably be combined to form one GRIN lens.

Particularly for endoscopic application, it is often advisable to arrange a deflecting element between the first GRIN lens and the second GRIN lens, e.g., for lateral scanning of cavities. The deflecting element is preferably a reflective prism. However, the deflecting element can also advantageously be a beamsplitter, preferably to separate excitation light from radiation emitted by the object. For this purpose, the beamsplitter can advisably have a dichroic coating between two equilateral prisms for spectral separation of the excitation radiation from the object emission.

In a miniaturized optically imaging system, particularly for endoscopic applications, which uses at least one GRIN lens system with a radial refractive index profile which generates an optical imaging of near-surface areas of an object in an image plane for an optical transmission system with a small diameter compared to the transmission length, the above-stated further object is met in a reduced variant of the invention in that a first GRIN lens is provided for reducing the divergence of the highly divergent light bundle from the object, in that a second GRIN lens is arranged along the optical axis downstream of the first GRIN lens for adapting a light bundle transmitted from the first GRIN lens to the aperture and object field of the downstream transmission system, in that the first GRIN lens defines a plane entrance surface of the optical system comprising the first GRIN lens and second GRIN lens, wherein the entrance surface is oriented orthogonal to an optical axis common to the optical system and to the transmission system, and in that a diffractive lens is provided between the first GRIN lens and the second GRIN lens for correcting the chromatic aberration of the optical system.

Through the combination of spherical lens element and GRIN lens, the numerical aperture of the miniature optics can be increased appreciably (up to NA=0.85). The spherical lens element and the GRIN lens should be considered as a system because the refractive index profile of the GRIN lens is shaped in such a way that the strong spherical aberration introduced by the spherical lens element is corrected by the GRIN lens.

Typically, spherical lenses and GRIN lenses have a normal chromatic aberration in which short wavelengths have a shorter focal length than longer wavelengths. A correction of the chromatic aberration of the GRIN lens(es) can be achieved with or without combining with the spherical lens element by means of a diffractive-optical lens element resulting in a total system that is achromatized for two wavelengths.

Since diffractive lenses have a strong abnormal chromatic aberration in which the focal length $f=C/\lambda$ is scaled to the reciprocal of the wavelength $\lambda$ and the proportionality constant C is determined by the geometric structure of the diffractive lens, diffractive lenses have a longer focal length with short wavelengths than with larger wavelengths and are accordingly best suited for compensation of the normal chromatic aberration of GRIN lenses.

The selection of achromatized wavelengths is suitably adapted depending on application and, for example, can be in the near infrared spectral region in the case of a two-photon microscope for a wavelength in the region of the excitation light and in the region of the half-wavelength of the excitation light for the other wavelength in the region of two-photon fluorescence. In a single-photon laser scanning microscope it can be useful for one wavelength to be the excitation wavelength of the laser and the other wavelength to be in the region of the fluorescence of the object or of the dye that is used.

The invention makes it possible to realize a miniaturized optical head, particularly for endomicroscopic applications, which has a high lateral and axial spatial resolution and an appreciably increased photon efficiency compared to conventional GRIN optics without using complicated multi-lens systems. The miniature optical head according to the invention has a strongly increased numerical aperture on the object side which causes the substantial increase in photon efficiency and optical resolution. The magnification and image-side numerical aperture of the miniature optical head can be adjusted so as to be favorably adapted to endoscopic image transmission systems.

Further, the optical system has minimized image errors such as spherical and chromatic aberrations and field curvature, and when using GRIN lenses typical chromatic aberration can be sufficiently compensated in a simple manner by combining with diffractive lenses.

The invention will be described more fully in the following with reference to embodiment examples.

BRIEF DESCRIPTION OF THE DRAWINGS

In the drawings:

FIG. 8 shows a configuration of the miniature optical system with a beamsplitter for separating excitation light and object radiation.

DESCRIPTION OF THE PREFERRED EMBODIMENTS

Figure 1:
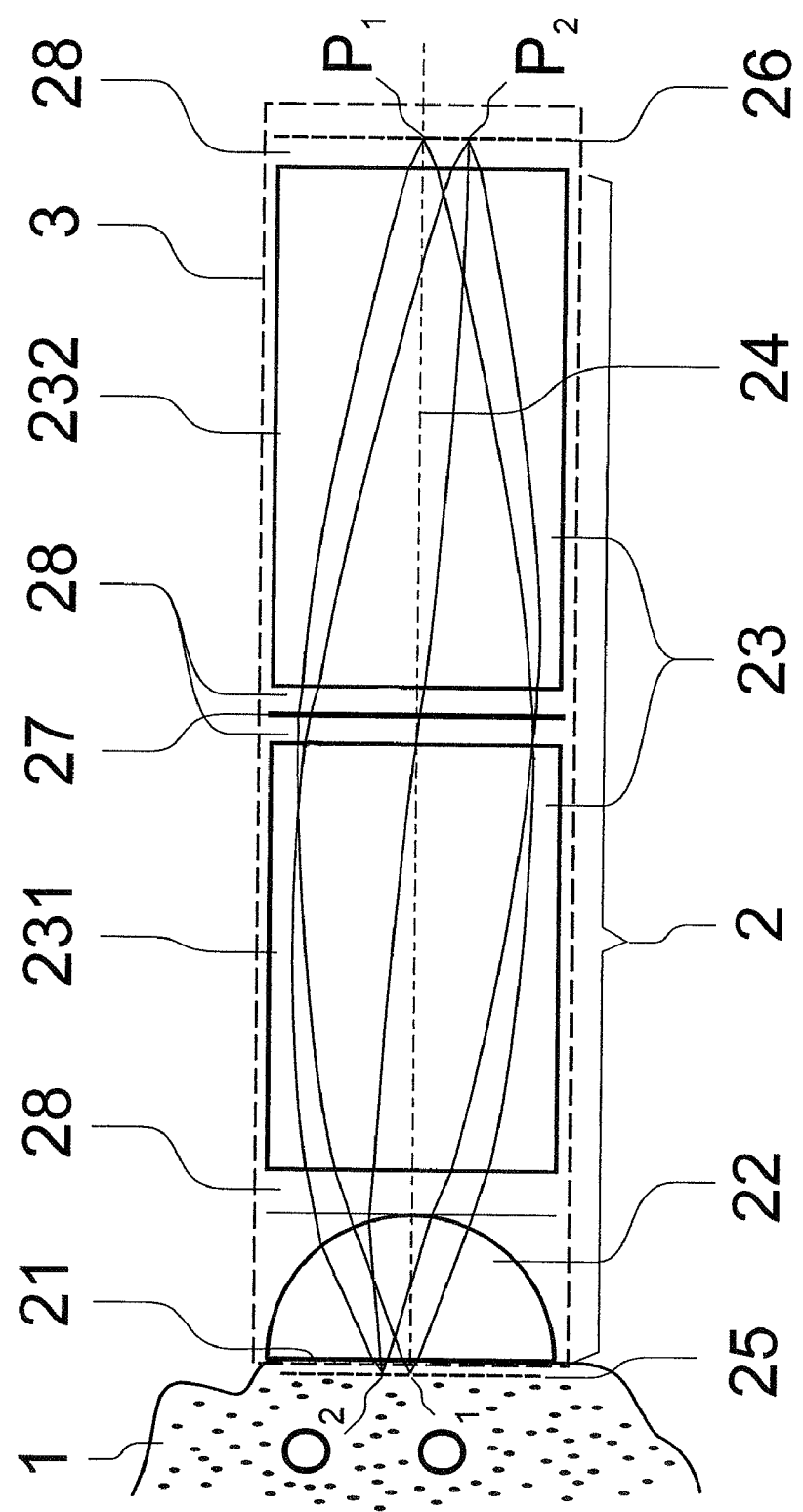
FIG. 1 shows a general view of the miniature optical system according to the invention.

For imaging an object 1 with high spatial resolution, a miniature optical system 2 according to the invention substantially comprises, as is shown in FIG. 1, an entrance surface 21, which is preferably placed on the object 1 in the form of the plane side of a plano-convex spherical lens element 22, and GRIN optics 23 which are arranged downstream of the spherical lens 22 along a common optical axis 24 of the optical system 2. Depending on application-oriented calculation of the total system 2, its object plane 25, on which the object points $O_1$ and $O_2$ selected in FIG. 1 lie, can be located at various depths in the volume of the object 1.

If it is necessary to compensate for the normal chromatic aberration of the refractive spherical lens element 22 and GRIN optics 23 which leads to a focal length that is shorter with small wavelengths than with larger wavelengths, a diffractive lens 27 is introduced in the beam path of the GRIN optics 23. Diffractive optical elements which are usually constructed as a diffractive microstructure (e.g., diffraction grating) have a strong abnormal chromatic aberration in which the focal length is scaled to the reciprocal of the wavelength $\lambda$ ($f=C/\lambda$) so that—with corresponding adjustment of the structure constant C of the diffractive lens 27—an optical system 2 can be adjusted to be achromatized for at least two wavelengths.

To the extent that achromatization is required, the diffractive lens 27 is advisably positioned in an area with low beam divergence in order to achieve a high color-correcting diffraction efficiency with a small thickness of the diffractive lens 27. As is shown in FIG. 1, an area of this kind is present when the GRIN optics 23 have a first GRIN lens 231 close to the object and a GRIN lens 232 remote of the object between which the diffractive lens 27 can be added. The GRIN lens 232 remote of the object then images the achromatized beam bundle in the image plane 26 in which an intermediate image is generated which is adapted to the aperture and object field of a transmission system 4 to a sensor unit (not shown).

Alternatively, the diffractive lens 27 can also be arranged in the divergent bundle between the spherical lens element 22 and the object-side GRIN lens 231.

As a rule, the miniature optical system 2 images the object points $O_1$ and $O_2$ lying within the object 1 with a desired magnification in the image points $P_1$ and $P_2$ of an image plane 26 which (at least for endoscopic applications) is only an intermediate image plane for the transmission system 4 arranged downstream.

For biological or medical applications, the optical system 2 typically has a distance from 20 to 200 μm between the object plane 25 and optical entrance surface 21. In the specific case of multiphoton microscopy, the distances can be up to and over 1 mm.

The optical system 2 has the following characteristic quantities:
- diameter, optical thickness and refractive index of the spherical lens 22,
- diameter, thickness and refractive index profile of the object-side GRIN lens 231 with dispersive (wavelength-dependent) characteristics,
- diameter, thickness and refractive index profile of an image-side GRIN lens 232 with dispersive (wavelength-dependent) characteristics,
- diameter, thickness and focal lengths at given wavelengths of a diffractive lens 27 for achromatization of the entire GRIN optics 23, and
- gaps 28 between the above-mentioned optical components if advantageous or required for the structural design of the optical system 2.

Because of the miniaturization of all of the optical components (about 1 mm diameter), the gaps 28 along the optical axis 24 in the system design are optimized as close to zero as possible in order to simplify the alignment of the entire optical system 2. Insofar as their presence is required or compulsory, the gaps can be filled with a medium or a variety of homogeneous media to influence the optical or mechanical characteristics of the entire system 2. In the simplest case, they are formed as air gaps or contain another suitable filling gas. In case of optical heads with particularly exacting mechanical requirements (e.g., subject to bending), it may be useful to fill the gaps with optical cement or gel having a suitable refractive index.

The GRIN lenses 231 and 232 need not have the same refractive index profile. In particular, the GRIN lens 232 remote of the object is essentially intended for adapting the magnification and the numerical aperture to the downstream transmission system 4 which can vary widely.

Figure 2:
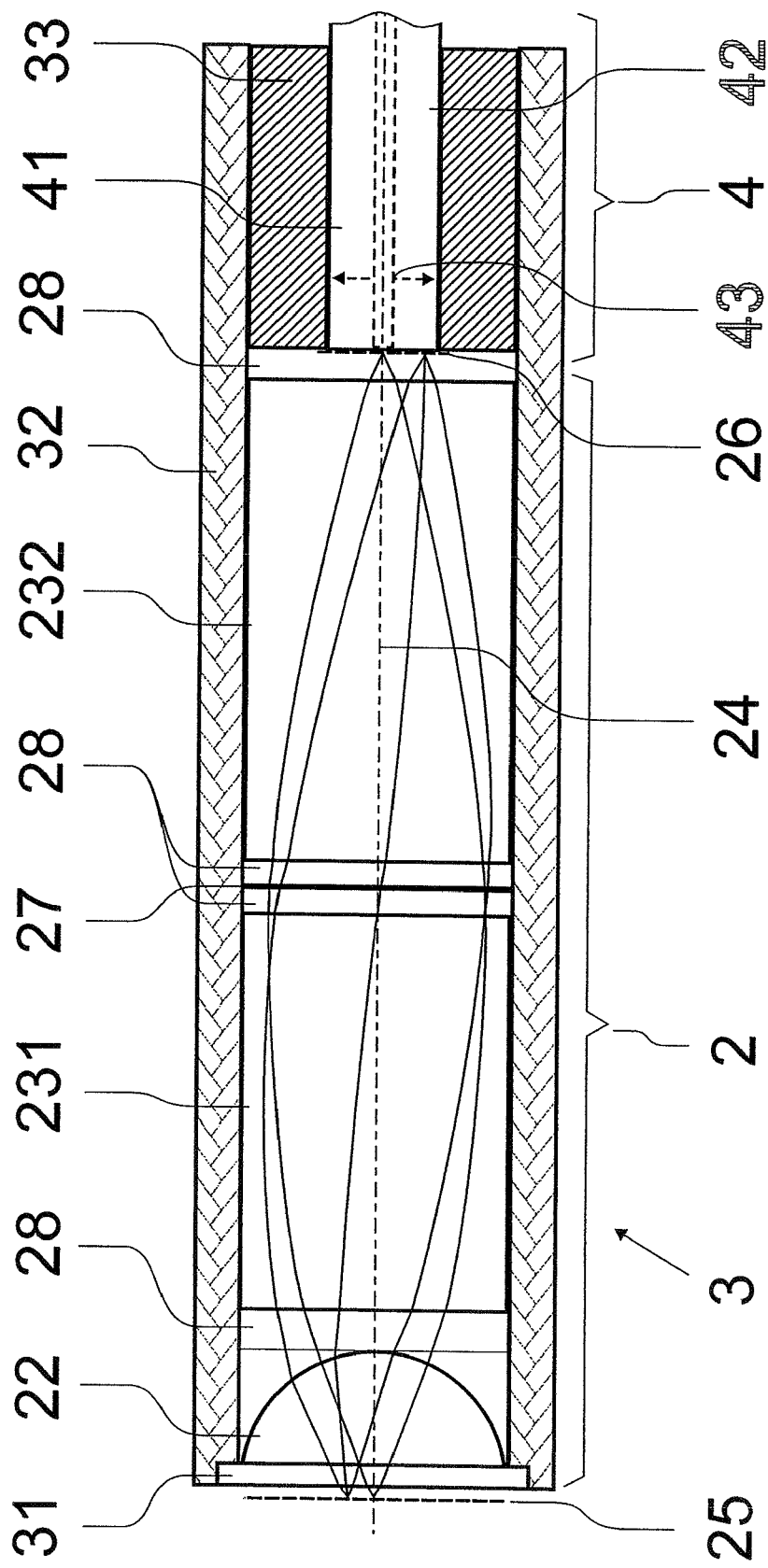
FIG. 2 shows a variant of the invention as an endoscopic head with image transmission optics.

FIG. 2 shows an embodiment example of the optical system 2 with a mechanical housing. The entrance surface 21 of the optical system 2 is advantageously realized by an optical window 31 of scratchproof glass or sapphire which is glued or soldered into a mechanical mount 32 for all optical elements of the miniature optical head 3 so as to be hermetically sealed. The spherical lens element 22 is glued on the window 31 internally (with optical cement adapted to the index of refraction) or optically contacted (with polished surfaces by applying with a brief, defined pressure).

An optical transmission system 4 to a sensor unit (not shown) is provided for endoscopic image transmission from the image plane 26 of the image-side GRIN lens 232. In this connection, FIG. 2 shows the end of a flexible image-conducting fiber bundle 41 which is fastened in the mechanical mount 32 of the miniature optical head 3 by means of an adapter sleeve 33. As alternative constructions of the transmission system 4 indicated by the shaded numbers, rigid relay optics 42 or an individual optical fiber which scans the image field by means of a microscanner (fiber-coupled microscanner 43) can also be connected instead of the image-conducting fiber bundle 41 and adjusted to the optical system 2 of the head 3 in the same way by means of the adapter sleeve 33 in the mechanical mount 32.

Figure 3:
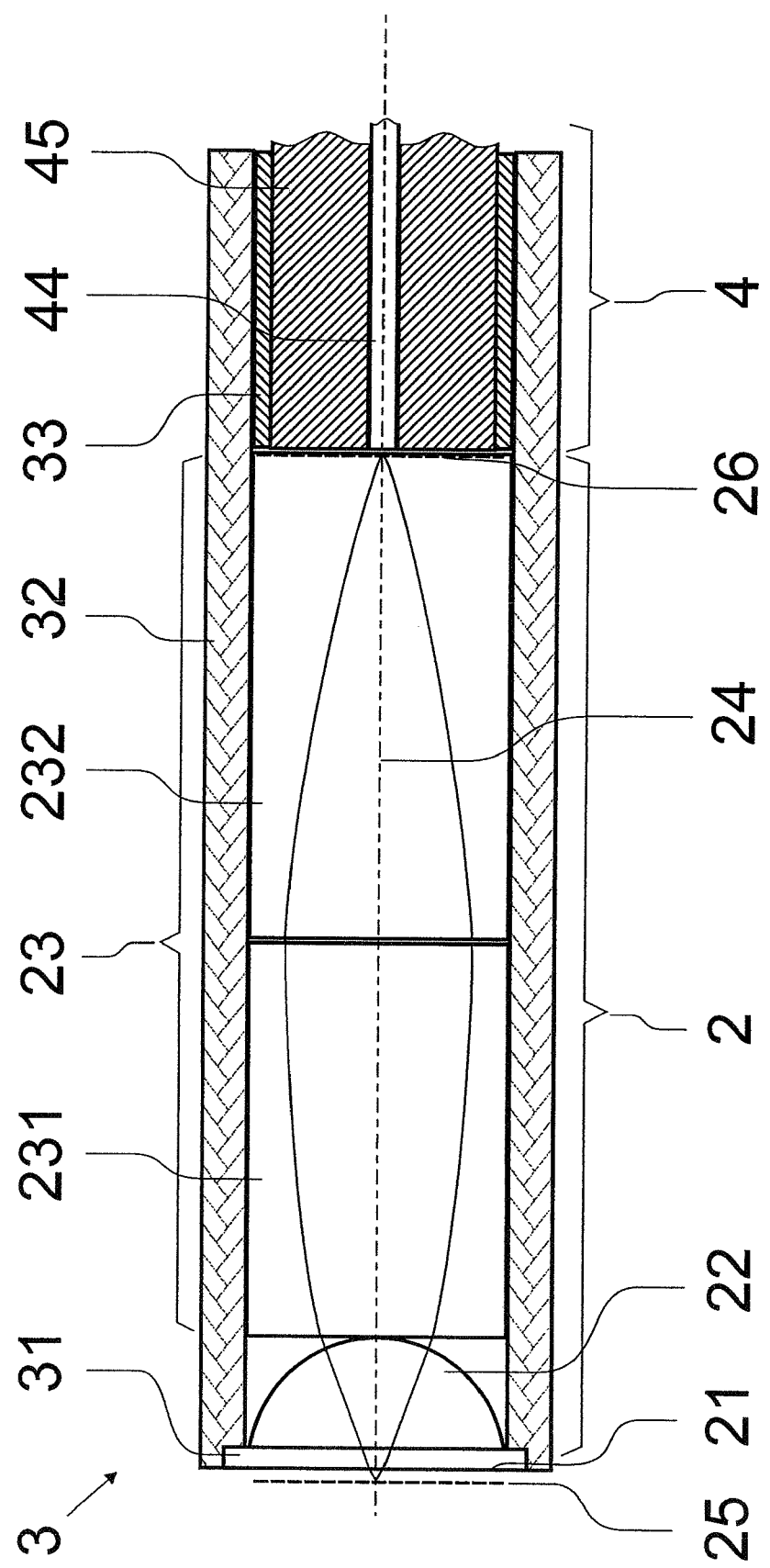
FIG. 3 shows a variant of the invention as an endoscopic head with integral detection.

FIG. 3 shows an embodiment example in which the light exiting from a thin excitation fiber 44 is only imaged along the optical axis 24 of the system 2 as a light point. The light coming from the object 1 (back-reflected light or fluorescence light in case of single-photon absorption, two-photon absorption or multiphoton absorption) is captured integrally through a reception fiber 45 and supplied to a detector. Alternatively, it could also be fed back to the excitation fiber 44 and transmitted to the detector (not shown).

In this case, the image scanning of the object 1 takes place by scanning (controlled movement) of the entire optical head 2. This arrangement is advantageous in that the correction of the aberrations of the system 2 is more successful because only one image point is active on the optical axis 33 and therefore only spherical and chromatic aberrations are significant. Because of the scanning movement of the entire optical head 2, all image points have the same imaging quality. In this construction of the invention, the diffractive lens 27 for achromatizing the GRIN optics 23 (in the area of weakly divergent beams between the GRIN lenses 231 and 232) can be dispensed with entirely because no chromatic correction is needed, since the fluorescent light is detected integrally.

A particularly simple system 2 without a diffractive lens 27 results when GRIN lenses 231 and 232 are combined to form a single GRIN lens in that the refractive index profile is formed in such a way that aberrations (primarily spherical aberrations) of the entire system 2 are minimized. The correction of the chromatic aberration which is not carried out in this example can be dispensed with when operating in a narrow wavelength spectrum (monochromatically), when excitation light and detection light are guided in optically separate beam paths (see embodiment example according to FIG. 8), or when the detection (e.g., of fluorescence) is carried out integrally (without optical imaging). The latter is particularly sufficient in multiphoton laser microscopy because the excitation occurs almost exclusively in the laser focus and an image recording is achieved by point-scanning of the object with the laser focus (scanning).

Figure 4:
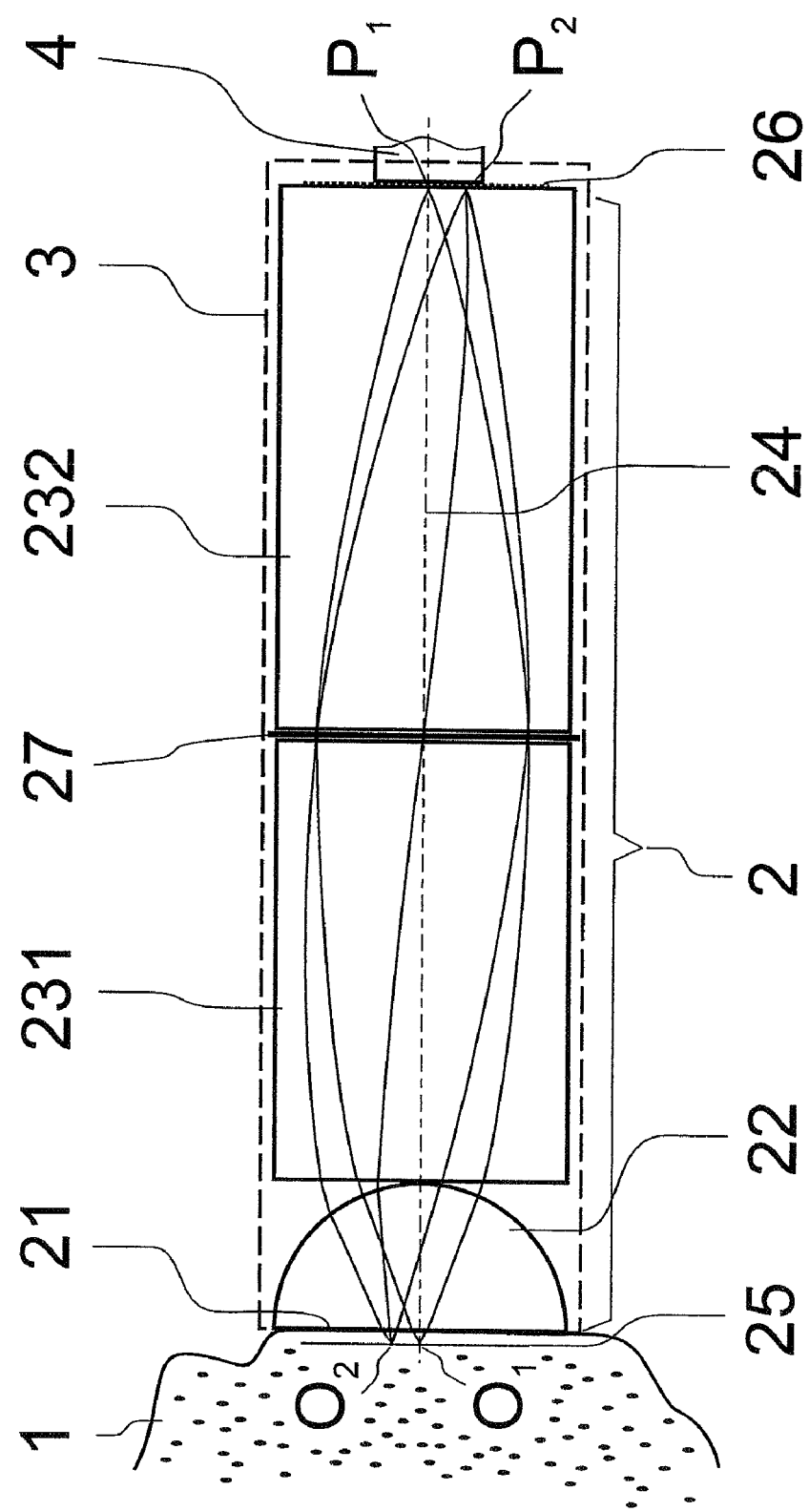
FIG. 4 shows a construction of the miniature optical system for particularly simple mounting without gaps.

FIG. 4 shows a construction of the invention in which all of the gaps 28 along the optical axis 24 of the optical system 2 are reduced to zero. This results in a very simple assembly in that all optical components starting with the spherical lens element 22, followed by the object-side GRIN lens 231, the diffractive lens 27, and the image-side GRIN lens 232 are stacked in the mechanical mount 32 (shown only in FIGS. 2 and 3) and align themselves in practice when the concluding adapter sleeve 33 is secured for fastening the transmission system 4. If an image-conducting fiber bundle 41 is used, as is the case in FIG. 2, it is in direct contact with the image-side GRIN lens 232, since the image plane 26 lies in the exit surface of the GRIN lens 232.

1st EMBODIMENT EXAMPLE

Figure 5:
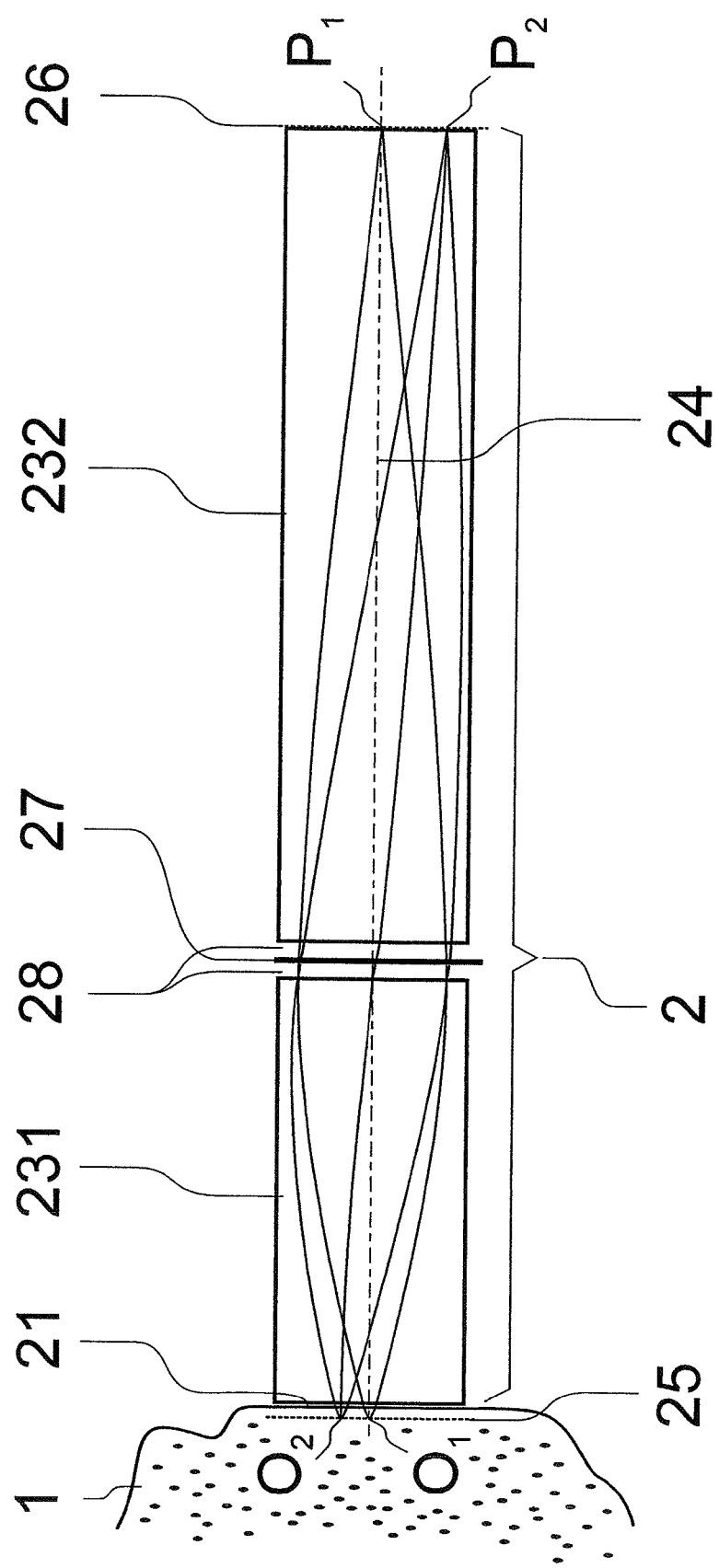
FIG. 5 shows a particular construction of the miniature optical system as exclusively achromatic GRIN optics.

In a concrete embodiment form according to FIG. 5, the optical system 2 has two identical GRIN lenses 231 and 232 with a nominal numerical aperture of 0.5 and a diameter of 1.0 mm. Achromatization is achieved for 830 nm and 500 nm by the diffractive lens 27 between the two GRIN lenses 231 and 232.

The object 1 is located at the entrance surface 21 of the object-side GRIN lens 231 having a thickness of 2.403 mm.

The refractive index profile of the two GRIN lenses 231 and 232 is reduced to a polynomial formulation at a reference wavelength $\lambda_{ref}=0.67$ μm:

$$n_{ref}(r) = n_0 + n_{r2} r^2 + n_{r4} r^4 \quad (1)$$

where r is the radial coordinate and $n_0$, $n_{r2}$, $n_{r4}$ are the refractive index profile parameters. The dependency of the refractive index profile on wavelength λ is described by the following dispersion model:

$$n^2(\lambda) = n^2(\lambda_{ref}) + K_1(\lambda^2 - \lambda^2_{ref})/\lambda^2 \quad (2)$$

where $n^2(\lambda_{ref}) = n^2_{ref}$ and $K_1$ is a function of $n_{ref}$.

$K_1$ is described by the linear equation:

$$K_1(n_{ref}) = K_{11} + K_{12} n^2_{ref} \quad (3)$$

Both GRIN lenses 231 and 232 have the same refractive index profile described by the following parameters:
$K_{11}=0.11098$;
$K_{12}=-0.06172$;
$n_0=1.6289$;
$n_{r2}=-0.3482$;
$n_{r4}=0.0620$;

The diffractive lens 27 is assumed to be an ideal thin lens for optimizing the optical design. The focal length depends on the wavelength, where $$f = C/\lambda, \quad (4)$$

where $C=0.004565$ mm². Accordingly, the diffractive lens 27 has a focal length of 5.5 mm at 830 nm and a focal length of 9.13 mm at 500 nm.

The second GRIN lens 232 is adjusted by its thickness of 2.171 mm in such a way that the image plane 26 lies exactly in the exit plane of the image-side GRIN lens for 830 nm and for 500 nm so that the desired achromatization is achieved in this plane. This is especially important for image transmission systems arranged downstream (image-conducting fiber bundle, relay optics, microscope, etc.) which require achromatic imaging.

2nd EMBODIMENT EXAMPLE

In another specific construction according to the basic optical scheme of FIG. 4, the miniature optical head 3 comprises an optical window 31 (material: BK7) with a thickness of 0.170 mm, a spherical lens element 22 (material: LaSFN9, spherical radius: 0.5 mm, thickness: 0.30 mm), two GRIN lenses 231 and 232 with a diameter of 1.0 mm, and a nominal numerical aperture of 0.5. Achromatization for 830 nm and 500 nm is achieved through a diffractive lens 27 between the two GRIN lenses 231 and 232.

All optical elements are in direct contact (as is shown in FIG. 4), i.e., there are no gaps 28 along the optical axis 24. This choice of optical design is advantageous for the alignment of the entire optical system 2 within the mechanical mount 32 with miniaturized head 3, particularly because of the very small diameters of the optical elements (1 mm).

In this instance, the object 1 is in water at a working distance of 50 μm from the entrance surface 21 of the object-side spherical lens element 22. The object-side GRIN lens 231 has a thickness of 1.480 mm.

As in the first embodiment example above, the refractive index profile of the two GRIN lenses 231 and 232 is described by equations (1), (2) and (3) with the following parameters:
$K_{11}=0.11098$;
$K_{12}=-0.06172$;
$n_0=1.6289$;
$n_{r2}=-0.3532$;
$n_{r4}=0.1032$;

For the calculation of the optical design, the diffractive lens 27 is assumed to be an ideal thin lens. Its focal length depends on the wavelength according to equation (4), where $C=0.003901$ mm² in this example. Accordingly, the diffractive lens 27 has a focal length of 4.7 mm at 830 nm and a focal length of 7.802 mm at 500 nm. The second GRIN lens 232 is adjusted with respect to its thickness of 2.007 mm in such a way that the image plane 26 lies 50 μm behind the exit plane of the GRIN lens 232 in air for 830 nm as well as for 500 nm. The entire optical system 2 is diffraction-limited up to an object-side numerical aperture of 0.85 and, consequently, is provided with a high spatial resolution in axial and lateral dimensions.

THIRD EMBODIMENT EXAMPLE

Miniature optical head comprising two GRIN lenses with 1.0 diameter. The object-side GRIN lens has a nominal numerical aperture of 0.5, the image-side GRIN lens has a nominal numerical aperture of 0.2, and an achromatization is achieved for 830 nm and 500 nm by a diffractive lens between the two GRIN lenses. The object is located in the entrance surface of the object-side GRIN lens having a thickness of 2.403 mm.

As in the first embodiment example above, the refractive index profile of the two GRIN lenses 231 and 232 is defined by the equations (1), (2) and (3) and is calculated for a reference wavelength of $\lambda_{ref}=0.67$ μm. Because of the different numerical apertures, they are characterized by different refractive index profiles, and the dependency of the profiles on wavelength also diverges.

For the object-side lens (NA=0.5), the refractive index profile is described by the following parameters:
$K_{11}=0.11098$;
$K_{12}=-0.06172$;
$n_0=1.6289$;
$n_{r2}=-0.3482$;
$n_{r4}=0.0620$;

For the second GRIN lens 232 (NA=0.2), the refractive index profile is described by the following parameters:
$K_{11}=0.05735$;
$K_{12}=-0.03843$;
$n_0=1.5239$;
$n_{r2}=-0.0522$;
$n_{r4}=0.0015$;

The focal length of the diffractive lens 27 is formulated as in equation (4) above. In this example, $C=0.0071961$ mm².

Accordingly, the diffractive lens 27 has a focal length of 8.67 mm at 830 nm and a focal length of 14.3922 mm at 500 nm.

The second GRIN lens 232 is adjusted with respect to its thickness of 5.044 mm in such a way that the image plane 26 (in the paraxial area) lies exactly in the exit plane of the GRIN lens 232 for 830 nm and for 500 nm.

In a reduced embodiment form of the invention in which the numerical aperture of the object-side GRIN lens 231 is sufficient for imaging purposes, an achromatic system 2 can also be constructed—as in FIG. 5—without a spherical lens element 22. In this case, the scanning plane of the object 1 is located at a certain working distance from the GRIN lens 23. As in the preceding examples, the diffractive lens 27 is preferably positioned in the area of low beam divergence between the two GRIN lenses 231 and 232. The GRIN lens 232 images in the image plane 26 which is an intermediate image plane for a transmission system 4 arranged downstream.

Figure 6:
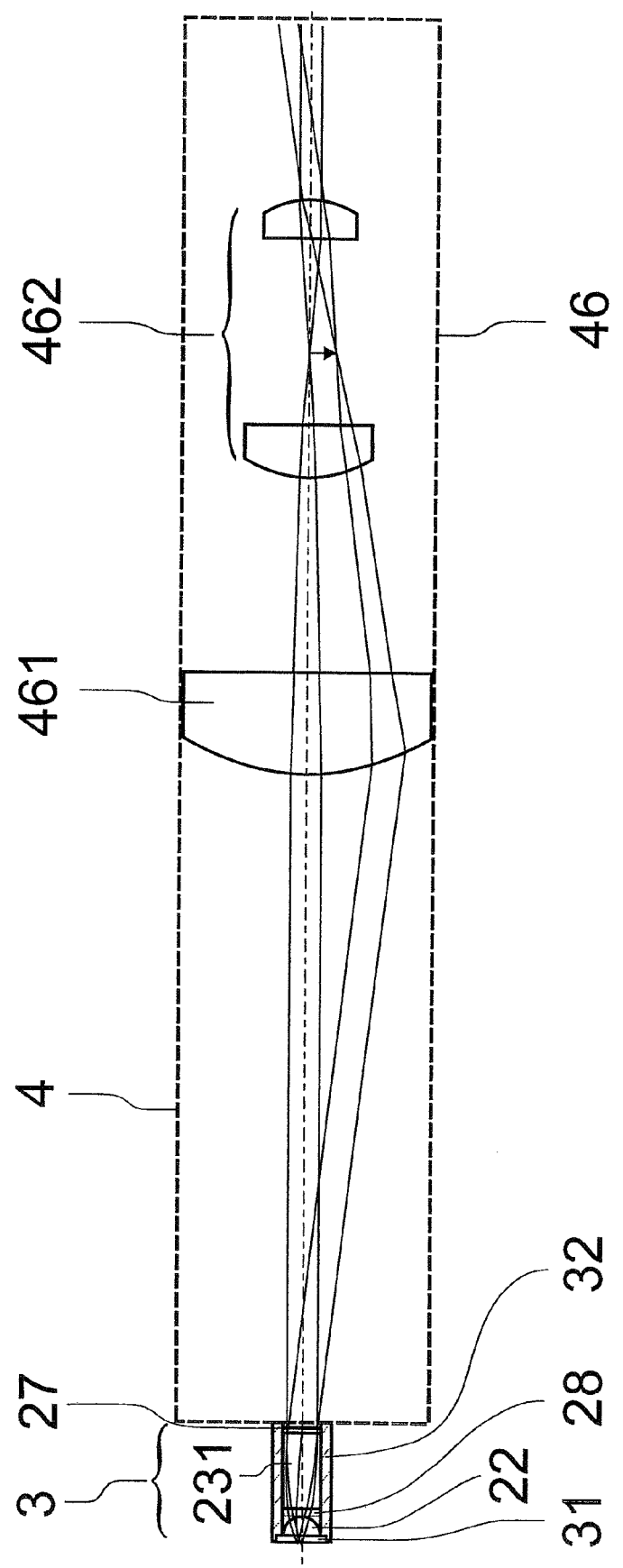
FIG. 6 shows a specific construction of the miniature optical system as input optics for a microscope body.

In another embodiment form of the invention, as is shown schematically in FIG. 6, the image-side GRIN lens 232 is replaced by conventional refractive optics (e.g., a multi-lens system). This can be particularly useful when the described miniature optical head 3 is fitted to a microscope body 46 in place of a microscope objective.

In this case, the optical system 2 is shortened by placing the spherical lens element 22 directly on the window 31 of the miniature optical head 3, followed after a gap 28 by only an object-side GRIN lens 231 and the diffractive lens 27 for achromatization, and is coupled to the mechanical mount 32 at the microscope body 46 (as transmission system 4). The optical head 3 accordingly replaces the microscope objective of any microscope body 46. In the example according to FIG. 6, this body comprises tube optics 461 and an ocular unit 462 through which is generated a real intermediate image that is then available for further image recording (not shown). The function of the second GRIN lens 232 is taken over in practice by the microscope body 46 in this example.

Particularly for endoscopic applications, it may be advantageous when the optical axis 24 of the object-side entrance surface 21 of the optical system 2 is angled relative to the optical axis 24 of the transmission system 4 because the object 1 to be imaged, e.g., biological tissue, often lies at the side walls of an endoscoped cavity. In this connection, various deflection angles can be advisable.

Figure 7:
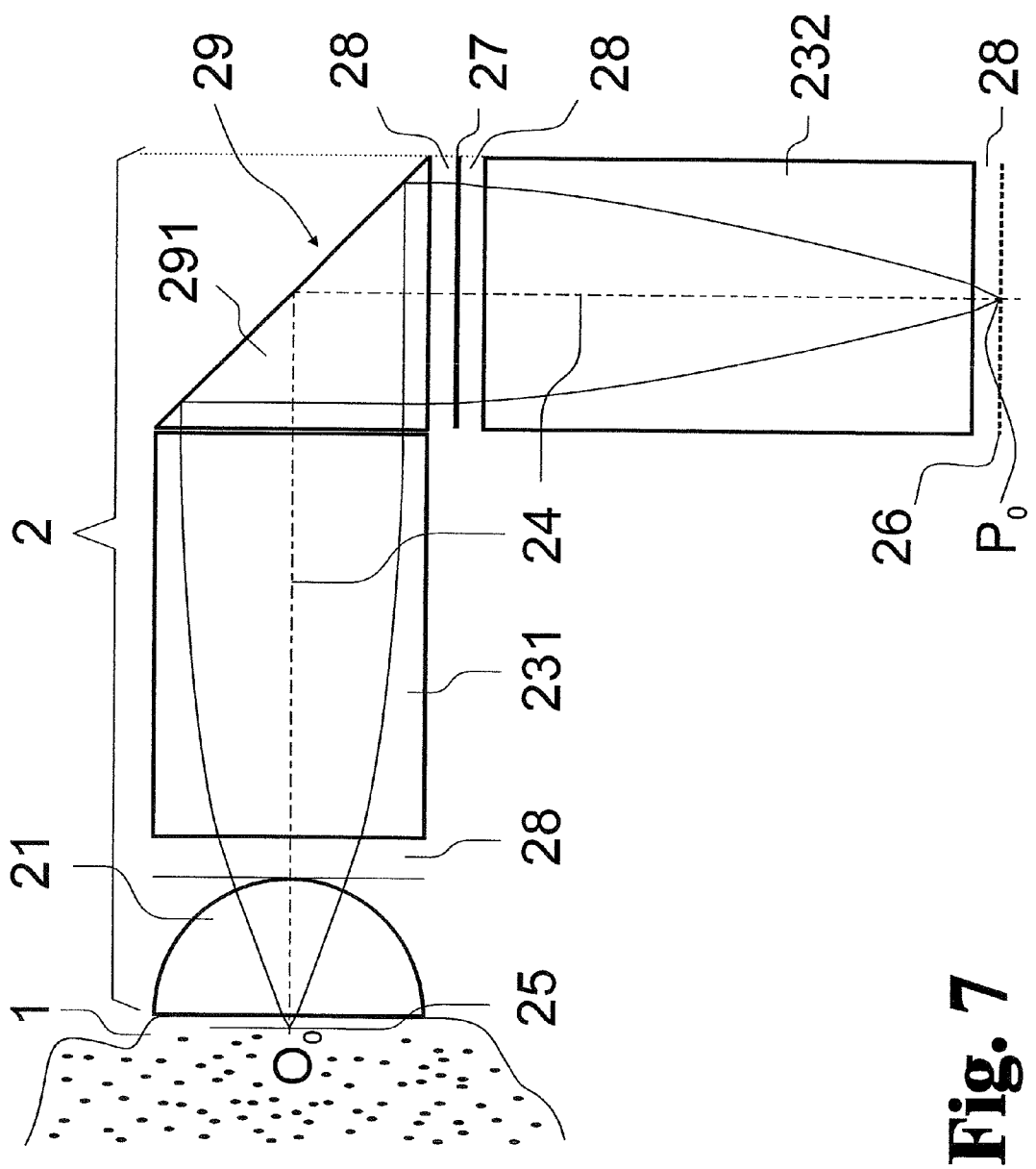
FIG. 7 shows a variant of the optical system with a beam-deflecting element for lateral scanning surfaces, particularly in endoscopic applications.

An example of a deflection angle of 90° is shown in FIG. 7. A beam-deflecting optical element 29 is preferably a microprism 291 which is positioned in the weakly divergent beam path, advisably between the two GRIN lenses 231 and 232, so that the aberrations introduced by the prism 291 are minimized. As in the preceding example, a diffractive lens 27 can be positioned between the prism 291 and the second GRIN lens 232 for correcting the chromatic aberration of the entire system. The gap 28 serves to minimize the aberration errors.

Alternatively, it is also possible to replace the microprism 291 by a mirror scanner by which the object 1 imaged by the spherical lens element 22 and first GRIN lens 231 can be scanned line by line.

FIG. 8 shows a construction in which the beam-deflecting optical element 29 is constructed as a beamsplitter 292. For applications in fluorescence endomicroscopy or also in multiphoton microscopy and multiphoton endoscopy, it is often useful to separate excitation light and radiation emitted by the object 1 by means of a beamsplitter 292, since they both generally have a different spectral region.

The beamsplitter 292 is preferably formed as a cube from two prisms 293 and 294, and the interface between the two prisms 293 and 294 has a dichroic beam-splitting coating 295. This can be arranged in such a way that the coating 295 passes the excitation light in transmission and deflects by reflection the radiation emitted by the object 1. Alternatively, the reverse is also possible.

In FIG. 8, the point $A_1$ of a light source plane in the excitation beam path is imaged in the object point $O_1$ by transmission through the beamsplitter 292. The radiation excited at the object point $O_1$ is then reflected in the beamsplitter 292 and imaged as an image point $P_1$ in the image plane 26 of the GRIN lens 233 of the detection beam path.

In this case, the optical system 2 is formed by an object-side GRIN lens 231, the beamsplitter 292, and two image-side GRIN lenses 232 and 233 arranged in the two resulting partial beam paths. The GRIN lenses 232 and 233 can be identically dimensioned, analogous to the second GRIN lens 232 of the preceding examples, or can be adapted differently to specific excitation beam paths and detection beam paths with respect to their optical configuration.

While the foregoing description and drawings represent the present invention, it will be obvious to those skilled in the art that various changes may be made therein without departing from the true spirit and scope of the present invention.

REFERENCE NUMBERS 1 object
2 (miniature) optical system
21 entrance plane
22 spherical lens element
23 GRIN optics
231 (object-side) first GRIN lens
232 (image-side) second GRIN lens
24 optical axis
25 object plane
26 image plane
27 diffractive lens
28 gap
29 deflecting element
291 microprism (with reflective coating)
292 (dichroic) beamsplitter
293, 294 prisms
295 coating
3 optical head
31 window
32 mechanical mount
33 adapter sleeve
4 transmission system
41 image-conducting fiber bundle
42 relay optics
43 (fiber-coupled) microscanner
44 excitation fiber
45 reception fiber
46 microscope system
461 tube optics
462 ocular unit
$A_1$ point (in the light source plane)
$O_1$, $O_2$ object point
$P_1$, $P_2$ image point

What is claimed is:

1. A miniaturized optically imaging system with high lateral and axial resolution for endomicroscopic applications, comprising:
   at least one GRIN lens system with radial refractive index profile which generates a microscopic optical imaging of near-surface areas of an object in an image plane for an optical transmission system with a small diameter compared to the transmission length;

a refractive plano-convex lens in the form of a homogeneous optical spherical lens element being provided and, together with the GRIN optics, forms an optical system;

a plane side of the spherical lens element defining a plane entrance surface of the optical system, said plane entrance surface being oriented orthogonal to an optical axis common to both the optical system and a downstream transmission system;

said spherical lens element being followed by a first GRIN lens for reducing divergence of a highly divergent light bundle from the spherical lens element; and a second GRIN lens for adapting the light bundle transmitted by the first GRIN lens to the aperture and object field of said downstream transmission system being arranged along the optical axis downstream of the first GRIN lens.

2. The arrangement according to claim 1, wherein a diffractive lens is arranged in a weakly divergent area of the light bundle of the optical system for correcting the chromatic aberration.

3. The arrangement according to claim 2, wherein the diffractive lens is between the first GRIN lens and the second GRIN lens.

4. The arrangement according to claim 1, wherein the diffractive lens is arranged between the refractive lens and the object-side first GRIN lens for correcting the chromatic aberration of an optical system.

5. The arrangement according to claim 1, wherein the optical system, which comprises at least a spherical lens element and a first and second GRIN lens, is arranged inside a cylindrical mechanical mount as a miniature optical head, the mechanical mount being hermetically sealed up by a window as entrance surface in front of the plane surface of the spherical lens element.

6. The arrangement according to claim 1, wherein the optical system is arranged along the optical axis without gaps.

7. The arrangement according to claim 1, wherein an image-conducting fiber bundle is arranged downstream of the second GRIN lens on the optical axis.

8. The arrangement according to claim 1, wherein relay optics are arranged downstream of the second GRIN lens on the optical axis.

9. The arrangement according to claim 1, wherein an individual optical fiber is arranged downstream of the second GRIN lens and is moved with respect to the optical system of the miniature optical head by means of a microscanner so that it scans an image.

10. The arrangement according to claim 5, wherein the transmission system following the second GRIN lens is aligned in the mechanical mount of the miniature optical head by an adapter sleeve.

11. The arrangement according to claim 10, wherein a thin excitation fiber for coupling in light is aligned in the mechanical mount along the optical axis by an adapter sleeve.

12. The arrangement according to claim 11, wherein a reception fiber is provided around the thin excitation fiber concentric to the optical axis and aligned by the adapter sleeve.

13. The arrangement according to claim 11, wherein the thin excitation fiber is used along the optical axis as a reception fiber simultaneously.

14. The arrangement according to claim 1, wherein the first GRIN lens and the second GRIN lens have the same refractive index profile.

15. The arrangement according to claim 1, wherein the first GRIN lens and the second GRIN lens have different refractive index profiles with different wavelength-dependent properties.

16. The arrangement according to claim 1, wherein the second GRIN lens is replaced by optics of a microscope body.

17. The arrangement according to claim 14, wherein the first GRIN lens and the second GRIN lens are combined to form one GRIN lens.

18. The arrangement according to claim 1, wherein a deflecting element is arranged between the first GRIN lens and the second GRIN lens.

19. The arrangement according to claim 18, wherein the deflecting element is a reflective prism.

20. The arrangement according to claim 18, wherein the deflecting element is a beamsplitter.

21. The arrangement according to claim 18, wherein the beamsplitter has a dichroic coating between two equilateral prisms for spectral separation of the radiation generated by the object and the excitation radiation.

22. A miniaturized optically imaging system for endomicroscopic applications, comprising:

at least one GRIN lens system with radial refractive index profile which generates an optical imaging of near-surface areas of an object in an image plane for an optical transmission system with a small diameter compared to the transmission length;

first GRIN lens being provided for reducing the divergence of the highly divergent light bundle from the object;

a second GRIN lens being arranged along the optical axis downstream of the first GRIN lens for adapting a light bundle transmitted from the first GRIN lens to the aperture and object field size of a downstream transmission system;

said first GRIN lens defining a plane entrance surface of the optical system comprising the first GRIN lens and second GRIN lens;

said entrance surface being oriented orthogonal to an optical axis common to the optical system and to the transmission system; and a diffractive lens being provided between the first GRIN lens and the second GRIN lens for correcting the chromatic aberration of the optical system.

* * * * *